United States Patent [19]

Ohshiro

[11] Patent Number: 4,504,091

[45] Date of Patent: Mar. 12, 1985

[54] RECLINING ANGLE ADJUSTMENT DEVICE

[75] Inventor: Hideyuki Ohshiro, Fujisawa, Japan

[73] Assignee: Shiroki Kinzoku Kogyo Kabushiki Kaisha, Kanagawa, Japan

[21] Appl. No.: 413,255

[22] Filed: Aug. 31, 1982

[51] Int. Cl.³ .............................................. A47C 1/025
[52] U.S. Cl. .................................. 297/362; 297/367; 297/369
[58] Field of Search .............. 297/361, 362, 363, 364, 297/365, 366, 367, 368, 369; 74/805; 192/95

[56] References Cited

U.S. PATENT DOCUMENTS 3,958,828  5/1976  Ishida et al. ......................... 297/369
4,113,308  9/1978  Werner et al. ....................... 297/362

Primary Examiner—William E. Lyddane
Assistant Examiner—Mark W. Binder
Attorney, Agent, or Firm—Birch, Stewart, Kolasch & Birch

[57] ABSTRACT

A reclining angle adjusting device used to obtain best angle of inclination of a reclining seat for passengers, including an external gear being activated by a compression spring, the first arm member fixed to a seat with an internal gear, the second arm member fixed to a seat back with an internal gear. Minute adjustment is performed through said external gear by way of rotation of an adjustment handle whereas rough adjustment is performed quickly by pushing said adjustment handle to disengage said external gear from said internal gear of the first arm member.

10 Claims, 6 Drawing Figures

RECLINING ANGLE ADJUSTMENT DEVICE

BACKGROUND OF THE INVENTION

The present invention is directed to a reclining angle adjusting device of reclining seat for cars, airplanes and so forth and more particularly to a reclining angle adjusting device through which both minute adjustment and rough adjustment are performed by using single adjustment handle for appropriate reclining angle.

Reclining seats which are adjustable in an angle of inclination thereof so as to conform to the figures of operators and passengers are adopted popularly in cars, airplanes and so forth in order to reduce their fatigue and secure their safety.

Adjustment of reclining angle is divided into two categories one of which is called minute adjustment and the other of which is called rough adjustment. In these categories, the latter means to make adjustment of an angle of inclination roughly so that the adjustment will be performed very quickly. Sometimes, the roughadjustment is called quick adjustment. The minute adjustment gives best reclining angle to operators and passengers by way of changing reclining angle minutely.

In conventional reclining angle adjusting devices, at least two levers are necessarily adopted for rough adjustment and minute adjustment so that the device become complex in construction. Especially, as conventional lever for rough adjustment is complicated in construction, reclining angle adjusting device become large in size, increased in weight and complexed to manufacture thereof in process. Consequently, there is a typical disadvantage that it is so expensive in manufacturing.

Japanese Kokai Tokkyo Koho published for public inspection on Feb. 26, 1980 under the opening No. 55(1980)-26934 relates to a reclining angle adjusting device. The specification and drawings shown an adjustment lever in which a portion extends downwardly to keep a roller, a locking plate which is removably engaged with the adjustment lever, a cover member which is engaged with the adjustment lever by means of a pin member, all of which are used for rough adjustment. However, it is apparent that these main elements make the device more complexed.

SUMMARY OF THE INVENTION

It is a principal object of the present invention to provide a reclining angle adjusting device which is simple in construction.

It is another object of the present invention to provide a reclining angle adjusting device which is manufactured without difficulties.

It is a further object of the present invention to provide a reclining angle adjusting device which is inexpensive in manufacture.

BRIEF DESCRIPTION OF THE DRAWING

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
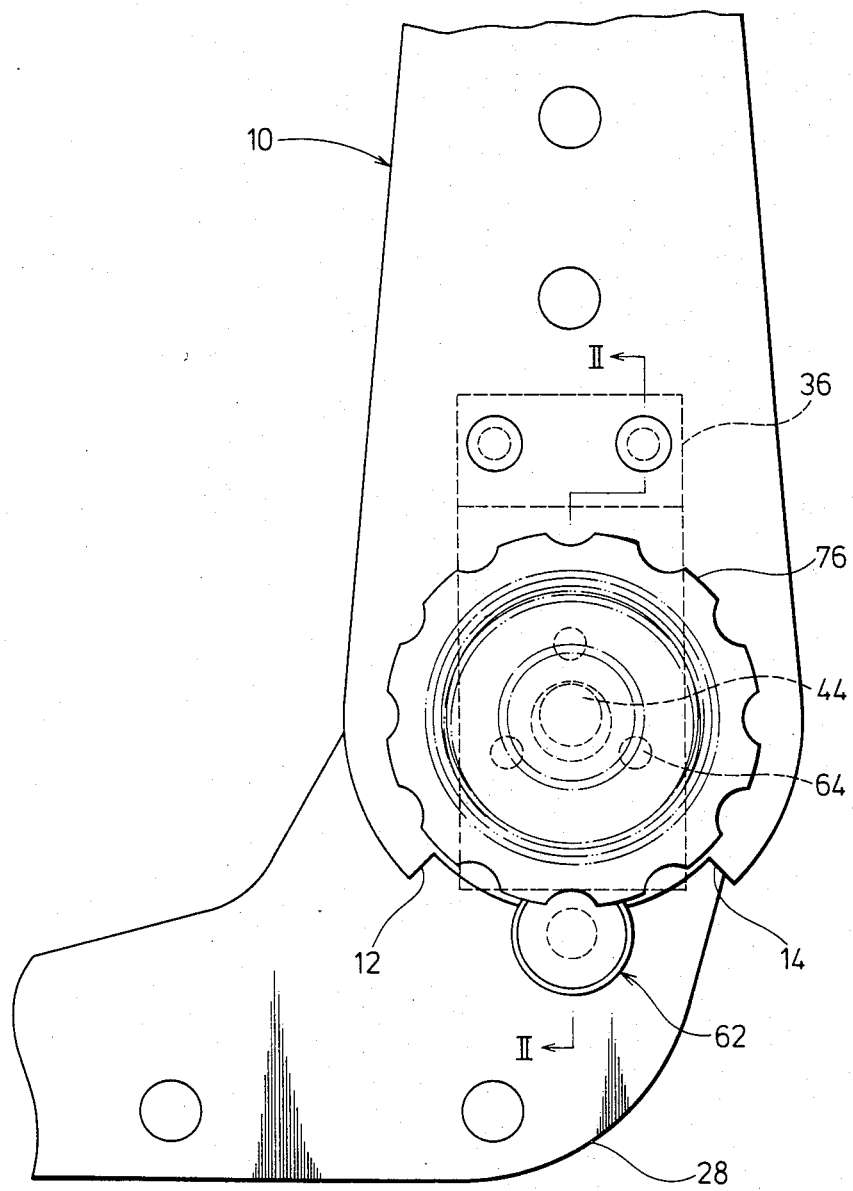
FIG. 1 is a front view of a portion of a reclining angle adjusting device according to the present invention.
Figure 2:
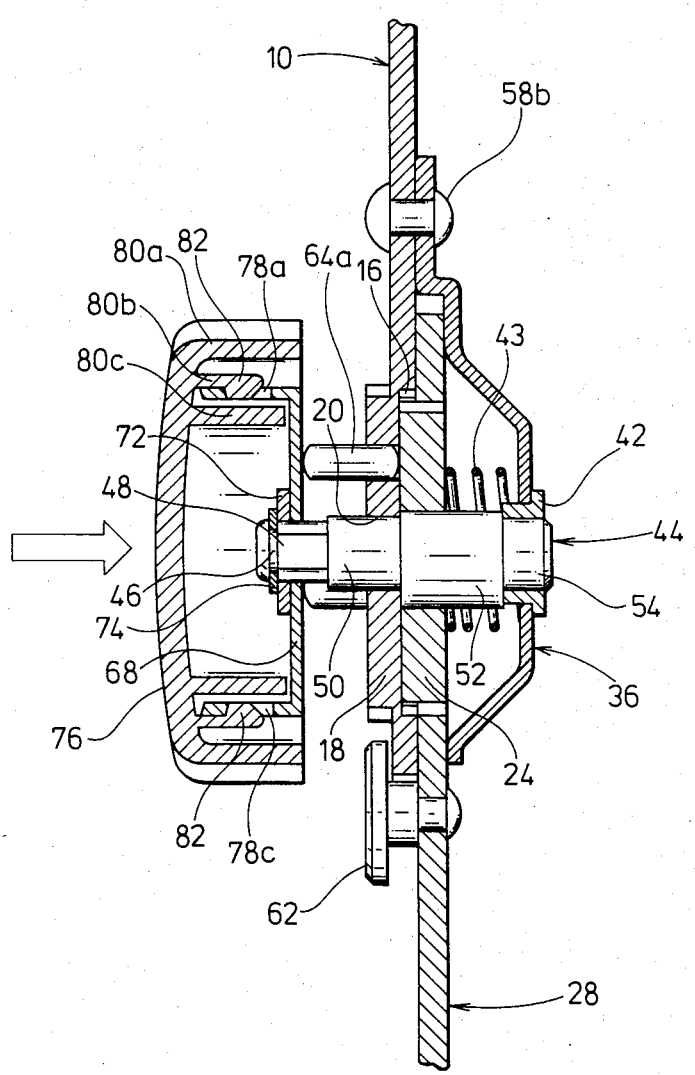
FIG. 2 is a sectional view taken along the line II—II in FIG. 1.
Figure 3:
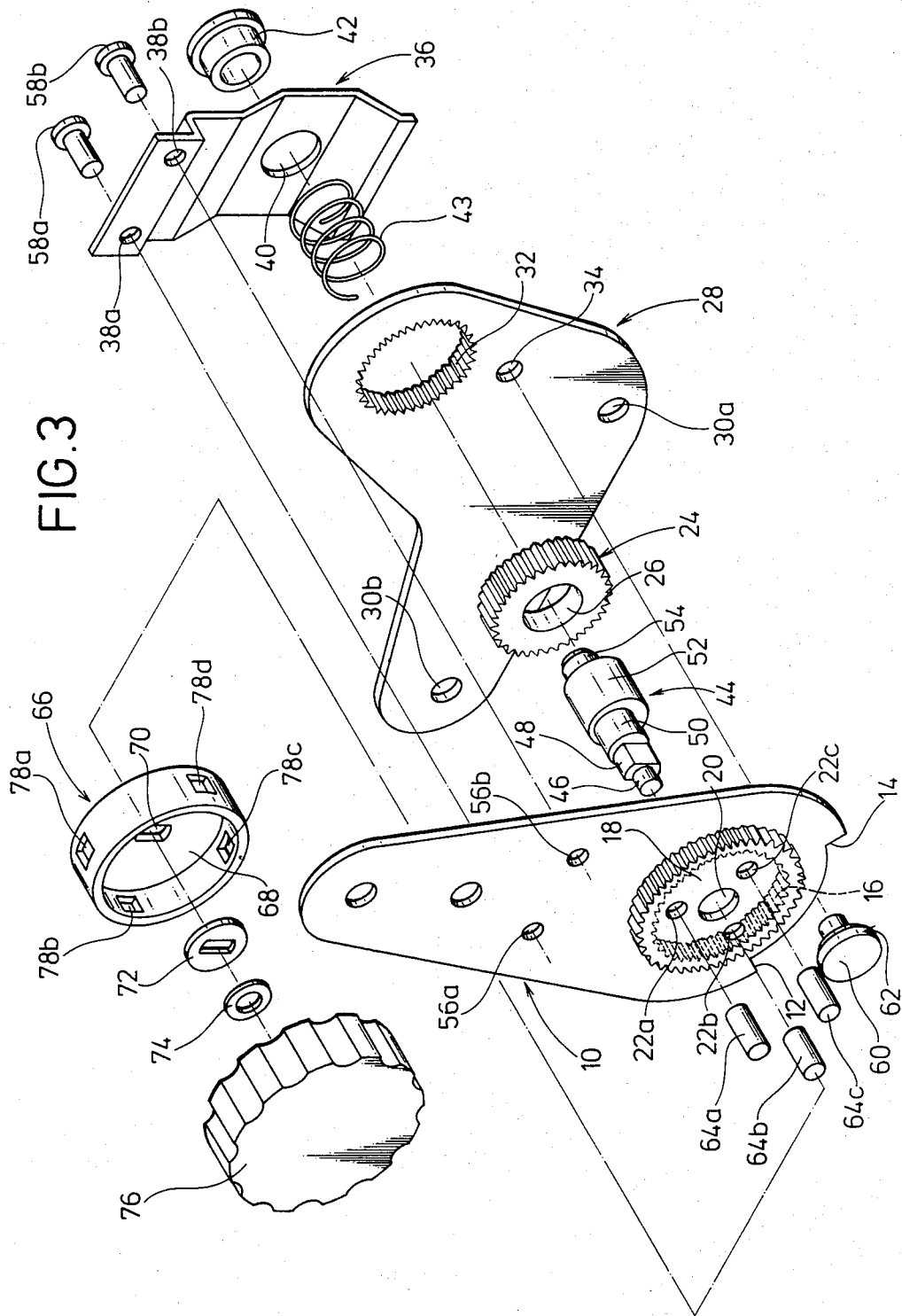
FIG. 3 is an exploded perspective view of the reclining angle adjusting device according to the present invention.

In FIG. 1 through FIG. 4, the first arm member 10 fixed to a seat back or back rest (not shown) includes stoppers 12 and 14 which are shaped by cutting off a rounded end portion thereof. The first arm member 10 is embossed to form the first internal gear 16 by using a conventional technique for precision press work. A through-type hole 20 is provided at the center of the embossed portion 18 in the first arm member 10. Furthermore, three (3) through-type holes 22a, 22b, and 22c are provided around the hole 20 with same distance as shown in FIG. 3. An external gear (intermediate gear) 24 includes a through-type hole 26 at the center thereof and the number of teeth of the external gear 26 is selected to be less than that of the internal gear 16.

The second arm member 28 includes two (2) holes 30a and 30b therein for fixing it to a seat (not shown). The second arm member 28 also has the second internal gear 32 of which number of teeth is the same of the external gear 24. A through-type hole 34 is provided under the internal gear 32 in the second arm member to insert a pin member which is described hereinafter.

As shown in FIG. 3, a supporting plate 36 is made of a square plain metal and includes two (2) through-type holes 38a and 38b at the upper portion thereof. A hole 40 is provided under the holes 38a and 38b in the plate 36. A bush 42 is pressed into the hole 40 to support a handle axle 44.

A compression spring or coiled spring 43 which has a larger diameter than that of the hole 40 is provided between the external gear 24 and the supporting plate 36 so that the external gear 24 is continuously pressed to the first arm member 10.

The handle axle 44 includes a small diameter portion 46, an oval shaped portion 48, coaxial portion 50, an eccentric portion 52 and a large diameter portion in this order. The coaxial portion 50 is inserted into the hole 20 of the first arm member 10 and the eccentric portion 52 is inserted into the hole 26 of the external gear 24. The coaxial portion 54 is inserted into the hole 40 of the supporting plate 36. The construction as described above will be kept rigidly since a pair of rivets 58a and 58b are inserted into two (2) rivet holes 56a and 56b through holes 38a and 38b to be rivetted.

A pin member 62 which has an enlarged head 60 at one end thereof is provided adjacent a lower rounded portion while the other end is inserted into the hole 34 of the second arm 28 to be fixed. Thus, when the first arm member rotates, the pin member 62 will come into contact with either stopper 12 or stopper 14 to control the rotation of the first arm member 10 within the pedetermined extent.

Each one end of slide pins 64a, 64b and 64c, which are provided on the same circumference in the embossed portion 18, is respectively inserted into the holes 22a, 22b and 22c to come into contact with the external gear 24 while the other end of the slide pins 64a, 64b and 64c are in contact with a plain portion 68 of a handle bracket 66. The length of the slide pins 64a, 64b and 64c should be enough to disengage the external gear 24 out of the internal gear 32 where the handle bracket 66 is pushed in the direction indicated by an arrow in FIG. 2. An oval hole 70 is provided in the plain portion of the handle bracket 66 to receive the oval portion 48 of the handle axle 44. A reinforcement 72 is provided inside of the handle bracket 66 in order to reinforce the plain portion around the oval hole 70. The small diameter portion 46 is inserted into a washer 74 which is caulked to the handle axle 44 to prevent the handle bracket 66 from disengaging therefrom.

Figure 4:
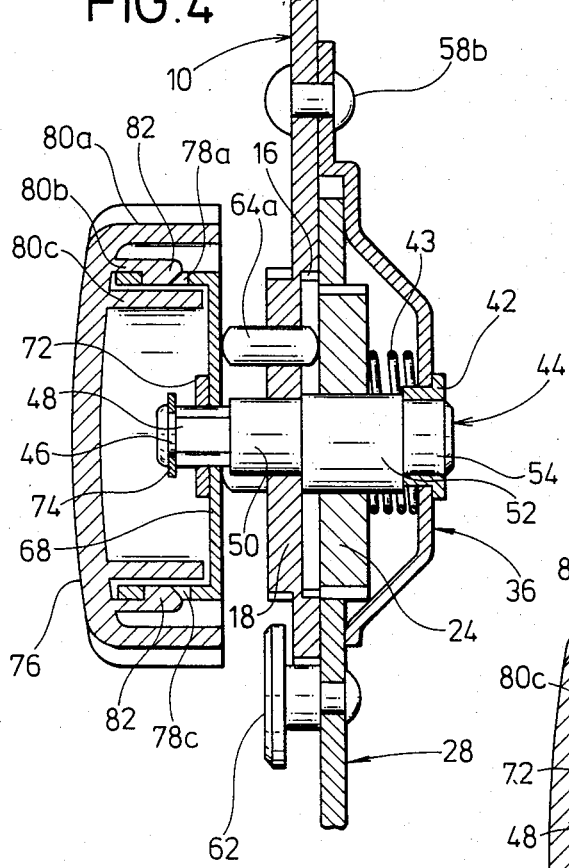
FIG. 4 is a sectional view showing the relationship between the first arm member and the external gear which is shifted out of the first arm member by means of the adjustment handle.

An adjustment handle 76 includes triple circumferencial side walls 80a, 80b and 80c and four nibs 82a, 82b, 82c and 82d (two (2) of which are not shown in FIGS. 2 and 4) projecting from the intermediate side wall 80b. The nibs 82a, 82b, 82c and 82d engage squared holes 78a, 78b, 78c and 78d which are provided in the side wall of the handle bracket 66.

In operation of the reclining angle adjusting device according to the present invention, where a passenger is sitting on a seat (not shown), the external gear 24 is in engagement with the internal gear 16 by means of the compression spring 43 as shown in FIG. 2. Thus, as the ajustment handle 76 rotates in one direction, the first arm member 10 rotates in the same direction under a predetermined reduction ratio. Subsequently, the pin member 62 comes into contact with either stopper 12 or stopper 14 to limit the rotation thereof.

The following expression is established.

$$Na = \{(Za - Zb)/Za\} \cdot Nc$$

Na: The number of revolutions of the first arm member.
Nc: The number of revolution of the adjustment handle 76.
Za: The number of teeth of the internal gear 16.
Zb: The number of teeth of the external gear 24.

(Zb < Za)

In the reclining angle adjusting device according to the present invention, the numerical value of the expression (Za−Zb) should sufficiently be less than that of the value Za.

Thus, it will be possible to perform a minute adjustment of inclination of the seat back by way of rotation of the adjustment handle 76 so that the reclining angle for best position is obtained for the passenger. Any reclining angle should be unchangeable without operation of the adjustment handle 76. The device is kept locked while no operation of the handle 76 is performed.

The following description is for rough adjustment of the reclining angle adjusting device.

For performance of quick adjustment, the passenger should press the adjustment handle 76 by his hand in the direction indicated by an arrow shown in FIG. 2 against the compression spring 43. Then, slide pins 64a, 64b and 64c are moved to slide by the plain portion 68 of the handle bracket 66 so that the external gear 24 is pushed to transfer in the same direction, when the external gear 24 is disengaged out of the internal gear 16, the first arm member 10 can rotate freely around the handle axle 44. Thus, the passenger will incline the back rest to perform quick adjustment.

An additional minute adjustment will be established after the passenger has released his hand from the adjustment handle 76 since the external gear 24 again comes into engagement with the internal gear 16 by the compression spring 43 which activates the external gear 24 in the opposite direction.

Figure 5:
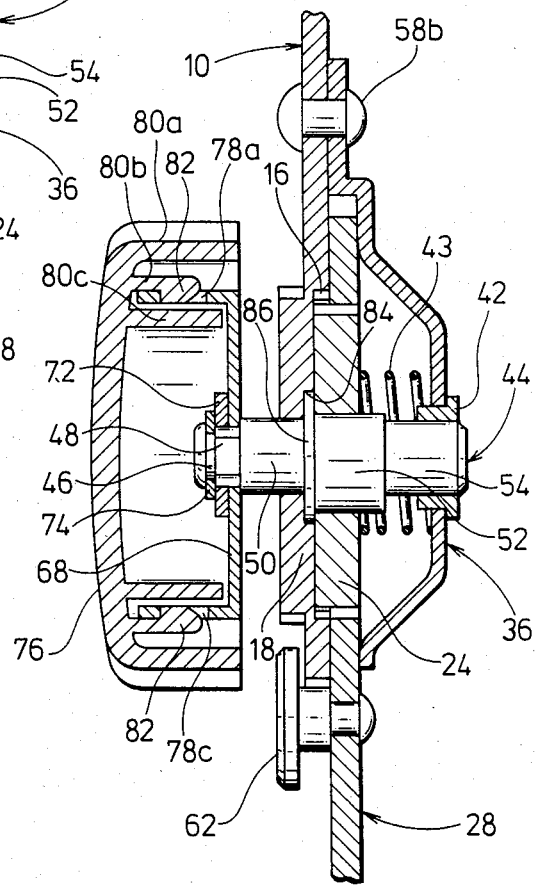
FIG. 5 is a longitudinal cross-section view of another embodiment according to the present invention.
Figure 6:
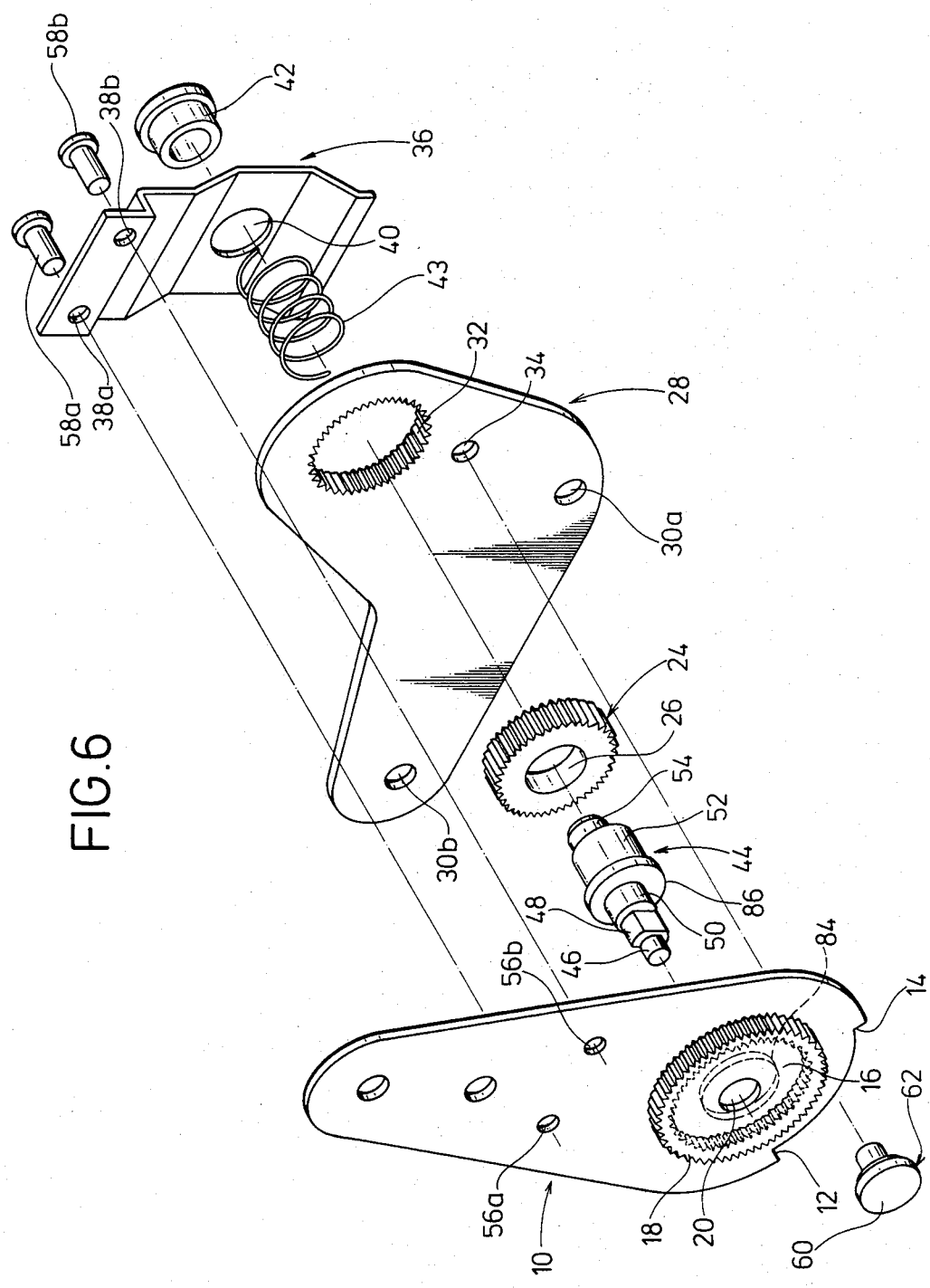
FIG. 6 is an exploded perspective view showing the relationship between the first arm member and the handle axis in FIG. 5.

FIGS. 5 and 6 show another preferred embodiment of reclining angle adjusting device according to the present invention.

In this embodiment, the same reference numeral identifies the same element that are shown in FIG. 1 through 4.

A recess 84 being concentric with the hole 20 is provided in the embossed portion of the first arm member 10 while a projection 86 like a circular disc corresponding to the recess 84 is provided between the coaxial portion 50 and the eccentric portion 52.

According to the above embodiment, when the adjustment handle 76 is pressed against the compression spring 43 in the direction indicated by an arrow shown in FIG. 2, the projection 86 pushes the external gear 24 in the same direction so that the external gear 24 is released from the internal gear 16.

On the other hand, the external gear 24 will return to original position by means of the compression spring 43 when the passenger releases his hand from the ajustment handle 10. Thus, the projection 86 can stay inside of the recess 84.

In the present invention, the reclining angle adjusting device becomes simple in construction since the intermediate gear or external gear is provided to engage the first arm member and second arm member respectively by using a single adjustment handle so that quick adjustment of the reclining seat will be performed easily by way of disengaging the external gear from the first arm member without using any special adjustment handle. The reclining angle adjusting device according to the present invention can be produced at an inexpensive cost. In addition to the above, the device can be small in size and can be light in weight.

While the invention has been particularly shown and described with respect to a preferred embodiment thereof, it will be understood by those in the art that various changes in form and detail may be made therein without departing from the spirit and scope of the invention. For example, the internal gears 16 and 32 will be able to be produced in separate bodies from the arms 10 and 28 respectively, and then the gears 16 and 32 will be set up with the arms 10 and 28 into an integral body. Furthermore, the first arm member will be able to be fixed to the seat back or back rest whereas the second arm member will be ale to be mounted to the seat.

What is claimed is:

1. A reclining angle adjusting device for a reclining seat, comprising:
   a sole adjustment handle for fine adjustment and rough adjustment for adjusting a reclining angle;
   a handle axle operatively connected for rotation by said sole adjustment handle;
   an eccentric portion affixed to said handle axle;
   an external gear supported by said eccentric portion of said handle axle and being rotatably mounted on said eccentric portion;
   a first arm member including a first internal gear selectively engaging with said external gear, said first internal gear having more teeth than the number of teeth on said external gear;

a second arm member including a second internal gear engaging with said external gear;

spring means operatively connected to said device and acting along the axis of said handle axle for biasing said external gear into engagement with said first internal gear; and shift means operatively connected between said handle and said external gear for shifting said external gear in a direction to be disengaged from said first internal gear against the biasing force of said spring means which presses said external gear into engagement with said first internal gear;

wherein said sole adjustment handle is rotated to perform fine adjustment of the reclining angle and is pressed to perform rough adjustment thereof.

2. A reclining angle adjustment device according to claim 1, wherein said shift means is comprised of at least one pin member, said pin member being adapted to push said external gear through a hole provided in said first arm member and sliding said adjustment handle along said handle axle.

3. A reclining angle adjustment device according to claim 1, wherein said shift means is compressed of a disc projection for sliding both said adjustment handle and handle axle integrally relative to said first arm member.

4. A reclining angle adjusting device according to claim 1, wherein said first arm member includes a stopper provided directly adjacent a lower portion thereof, and a pin member for contacting said stopper to limit rotation of said first member is provided adjacent said lower portion.

5. A reclining angle adjusting device according to claim 2, wherein said adjustment handle includes a handle bracket having a plain portion therein to shift said pin member.

6. A reclining angle adjusting device according to claim 2, wherein the number of said pin members is more than two, the number of said holes being more than two corresponding to said pin members and said holes being provided on a concentric circle of a hole through which said handle axle is inserted.

7. A reclining angle adjusting device according to claim 5, wherein said handle bracket includes at least one hole in said side wall portion thereof while said adjustment handle has at least one nib projecting therefrom, said adjustment handle being secured to said handle bracket by engaging said nib with said hole.

8. A reclining angle adjusting device according to claim 2, wherein said spring means is a compression spring being provided adjacent said second arm member for engaging said external gear with said first internal gear.

9. A reclining angle adjusting device according to claim 8, wherein said compression spring is a coil spring.

10. A reclining angle adjusting device according to claim 9, wherein one end of said coil spring is in contact with a supporting plate fixed to said first arm member whereas the other end of said coil spring is in contact with said external gear.

* * * * *